United States Patent
Takahashi et al.

(10) Patent No.: US 9,868,457 B2
(45) Date of Patent: Jan. 16, 2018

(54) STEERING APPARATUS AND METHOD FOR MANUFACTURING SAME

(71) Applicant: YAMADA MANUFACTURING CO., LTD., Kiryu-shi (JP)

(72) Inventors: Ryosuke Takahashi, Kiryu (JP); Norihiko Yokota, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 0 days.

(21) Appl. No.: 15/287,586

(22) Filed: Oct. 6, 2016

(65) Prior Publication Data

US 2017/0106896 A1 Apr. 20, 2017

(30) Foreign Application Priority Data

Oct. 16, 2015 (JP) .................................. 2015-205048

(51) Int. Cl.
*B62D 1/189* (2006.01)
*B62D 1/16* (2006.01)

(52) U.S. Cl.
CPC .............. *B62D 1/189* (2013.01); *B62D 1/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0025315 A1* | 2/2003 | Matsumiya | ............ | B62D 1/184 280/775 |
| 2006/0096410 A1* | 5/2006 | Sawada | .................... | B62D 1/16 74/552 |
| 2014/0318302 A1* | 10/2014 | Watanabe | .............. | B62D 1/184 74/493 |
| 2015/0107398 A1* | 4/2015 | Nagasawa | .............. | B22D 17/00 74/493 |
| 2015/0107399 A1* | 4/2015 | Nagasawa | ............ | B22D 19/045 74/493 |
| 2015/0122074 A1* | 5/2015 | Hagiwara | .............. | B62D 1/185 74/493 |
| 2015/0203146 A1* | 7/2015 | Kii | ........................ | B62D 1/189 74/493 |
| 2015/0274189 A1* | 10/2015 | Urcola Alberdi | ...... | B62D 1/185 74/493 |
| 2016/0185377 A1* | 6/2016 | Johr | ........................ | B62D 1/16 74/493 |
| 2016/0214636 A1* | 7/2016 | Watanabe | .............. | B62D 1/185 |
| 2016/0251026 A1* | 9/2016 | Takahashi | .............. | B62D 1/184 |
| 2016/0355208 A1* | 12/2016 | Orihara | .................. | B62D 1/185 |

FOREIGN PATENT DOCUMENTS

JP 2001-347953 A 12/2001

* cited by examiner

*Primary Examiner* — Nicole T Verley
(74) *Attorney, Agent, or Firm* — McGinn IP Law Group, PLLC

(57) ABSTRACT

A steering apparatus includes: a fixing bracket fixed by being suspended to a vehicle body and having fixed side portions on both sides in a width direction of the vehicle body; and an outer column formed of aluminum by die-casting and sandwiched between the fixed side portions, wherein protrusion portions protruding toward both sides in the width direction are integrally formed on a rear end of the outer column.

10 Claims, 4 Drawing Sheets

VIEW ALONG ARROW Z-Z

CROSS-SECTION ALONG ARROW X-X

VIEW ALONG ARROW Y-Y

VIEW ALONG ARROW Z-Z

ENLARGED VIEW OF (α)-PORTION

EXAMPLE OF
CONVENTIONAL
HOLDING TOOL

OUTER COLUMN

INNER CIRCUMFERENTIAL SURFACE
(MACHINED SURFACE)

STEERING APPARATUS AND METHOD FOR MANUFACTURING SAME

BACKGROUND OF THE INVENTION

1. Field of the Invention

The present invention relates to a vehicle steering apparatus and a method for manufacturing the same.

2. Description of the Related Art

A steering apparatus that operates the direction of a vehicle is configured to adjust a tilt position and a telescopic position so as to fit with the physique of a driver. Adjustment of the tilt position is related to the angle of a steering shaft and is recognized as adjustment of the height of a steering wheel for a driver. Adjustment of the telescopic position is related to the length of the steering shaft and is recognized as adjustment of the distance to the steering wheel for a driver.

A general steering apparatus is disclosed in Japanese Patent Application Publication No. 2001-347953. A lower side (the front wheel side) of a steering apparatus is rotatably supported by a lower bracket of a vehicle body and an upper side (the steering wheel side) is fixed by being suspended on a bracket. The steering apparatus has an outer column that grasps a shaft that transmits the rotation of the steering wheel, and the outer column is fixed by being suspended on the bracket.

Adjustment of the telescopic position is performed such that the steering wheel is manually moved back and forth whereby a shaft and an inner column are slid back and forth in the outer column. The steering wheel is clamped and fixed at a desired position by an operating lever (a clamping lever). When the operating lever is operated, the clamping bolt is fastened, the width between the bracket and the outer column narrows, and the shaft and the inner column are fixed.

A cross-section of the outer column has a ring shape having a notch formed in a portion thereof. When the clamping bolt is loosened and fastened, the cross-sectional shape changes slightly and the shaft and the inner column are allowed to slide and are fixed relative to each other.

The outer column, the shaft, and the inner column need to slide smoothly when the operating lever (the clamping lever) is unclamped to adjust the telescopic position. It is very important to machine precisely the inner circumferential surface of the outer column to allow smooth sliding.

SUMMARY OF THE INVENTION

The outer column is formed of aluminum by die-casting and is an approximately cylindrical member having a "C" or "U"-shaped cross-section having a notch formed in a portion thereof. When the outer column is subjected to machining processing, it is necessary to press and fix the outer column using a certain method. For example, as illustrated in FIG. 4, the outer column may be held and fixed in an up-down direction by a holding tool that holds the outer column in a surrounding manner and the inner circumferential surface may be machined using a drill or the like. However, the outer column has a notch formed in a portion thereof as described above. Therefore, in order to machine the outer column with high accuracy, a high-accuracy manufacturing technique of controlling fixing force to manage a strain amount is required.

Therefore, an object (a technical problem to be solved by) of the present invention is to provide a steering apparatus, in which in an outer column formed of aluminum by die-casting, accurate machining processing can be realized without requiring complex management of controlling fixing force to adjust a strain amount, and to provide a method for manufacturing the steering apparatus.

The present inventor has solved the above problems by providing, as a first embodiment, a steering apparatus including: a fixing bracket fixed by being suspended to a vehicle body and having fixing side portions on both sides in a width direction of the vehicle body; and an outer column formed of aluminum by die-casting and sandwiched between the fixing side portions, wherein protrusion portions protruding toward both sides in the width direction are integrally formed on a rear end of the outer column.

A second embodiment of the present invention solves the problems by providing the steering apparatus according to the first embodiment, in which a slit extending in an axial direction is formed in the outer column, and the protrusion portions are formed integrally at a position corresponding to a horizontal surface that passes through a shaft center of the outer column or on an opposite side to a position at which the slit is formed in relation to the horizontal surface.

A third embodiment of the present invention solves the problems by providing the steering apparatus according to the first or second embodiment, in which at least one of a rear edge of the fixing side portion and a front surface of the protrusion portion has a concave-convex shape.

A fourth embodiment of the present invention solves the problems by providing the steering apparatus according to the first or second embodiment, in which a rear side of the protrusion portion is thinner than a front side of the protrusion portion.

A fifth embodiment of the present invention solves the problems by providing a method for manufacturing the steering apparatus according to the first or second embodiment, the method including machining an inner circumferential surface of the outer column in a state in which the protrusion portions are fixed by a fixing tool.

In the present embodiment, when the inner circumferential surface of the outer column is machined and polished, the protrusion portions protruding toward both sides in the width direction are pressed and fixed, the inner circumferential surface can be processed accurately without applying strain to the outer column which is a processing member. For example, when the inner circumferential surface is machined in a circular form, it is easy to process the inner circumferential surface in a perfect circle with high accuracy. Moreover, the protrusion portions protruding toward both sides in the width direction come into contact with the rear edge of the fixing bracket in the event of a secondary collision to prevent rotation of the fixing bracket.

Since the slit extending in the axial direction is formed in the outer column, the inner circumferential surface requires more machining processing on the opposite side of the slit in relation to the horizontal surface that passes through the shaft center.

DESCRIPTION OF THE PREFERRED EMBODIMENTS

Figure 1A:
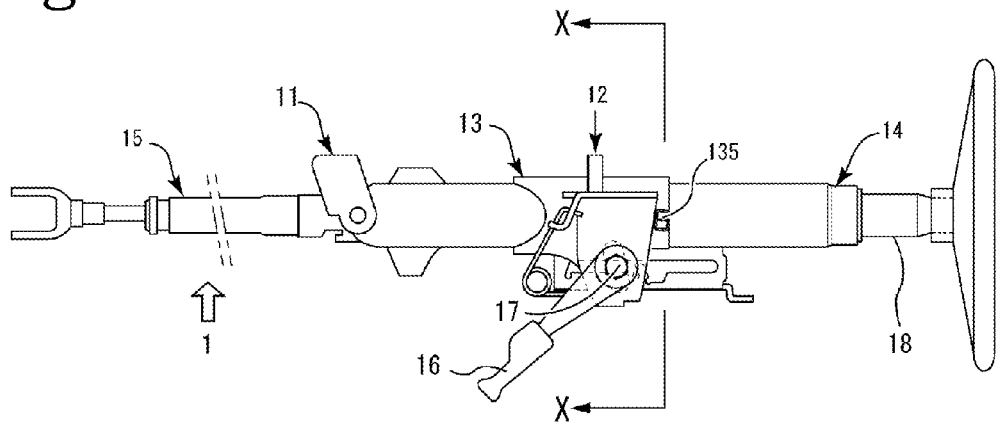
FIG. 1A is a side view illustrating an example of a steering apparatus according to the present invention.

FIG. 1A illustrates a side view of a steering apparatus according to a first embodiment of the present invention. In FIG. 1(A), a steering apparatus 1 includes a tilt center holding portion 11 which is fixed by being suspended on a vehicle body (not illustrated) and a fixing bracket 12. An outer column 13 is supported by the tilt center holding portion 11 on a vehicle front side (the left side of the drawing) and is sandwiched by the fixing bracket 12 on a vehicle rear side (the right side of the drawing). An inner pipe 14 passes through the outer column 13, and a front side of the inner pipe 14 is connected to a lower shaft 15. A rear side (the right side of the drawing) of the inner pipe 14 is attached to a steering wheel, with an upper shaft 18 being interposed therebetween.

Adjustment of a telescopic position is performed by unclamping a clamping lever 16 to manually move the steering wheel back and forth so that the upper shaft 18 and the inner pipe 14 are slid back and forth in the outer column 13. The steering wheel is clamped and fixed at a desired position by the clamping lever 16. When the clamping lever 16 is operated, the width between the fixing bracket 12 and the outer column 13 narrows and the inner pipe 14 is fixed. A pair of fixed side portions 121 that sandwich the outer column 13 are provided on both sides in the width direction of the fixing bracket 12. A fixed-side through-hole 121a which is a long hole extending in an up-down direction is formed in the fixed side portion 121 (FIG. 1C).

The outer column 13 includes a grasping body portion 131 that grasps the inner pipe 14 and a pair of clamping portions 132 for clamping the grasping body portion 131. A through-hole 132a is formed in the clamping portion 132. A slit 133 is formed between both clamping portions 132. A clamping bolt 17 is configured to pass through the through-hole 121a and the through-hole 132a to clamp the fixing bracket 12 and the outer column 13 (FIGS. 1B and 1C).

Since the slit 133 is formed in the outer column 13, it is possible to change the width in the left-right direction of the grasping body portion 131 of the outer column 13 by the operation of the clamping lever 16 to sandwich the inner pipe 14. Moreover, in the event of a secondary collision in which a driver collides with the steering wheel during a collision accident, the inner pipe 14 slides through the outer column 13.

The outer column 13 is manufactured using an aluminum alloy by die-casting and includes the grasping body portion 131 that grasps the inner pipe 14, the slit 133 formed along an axial direction of the grasping body portion 131, and the clamping portions 132 formed along the axial directions of slit edges that face each other in the width direction of the slit 133. The clamping portion through-hole 132a through which the clamping bolt 17 passes is formed in the clamping portion 132.

Figure 1B:
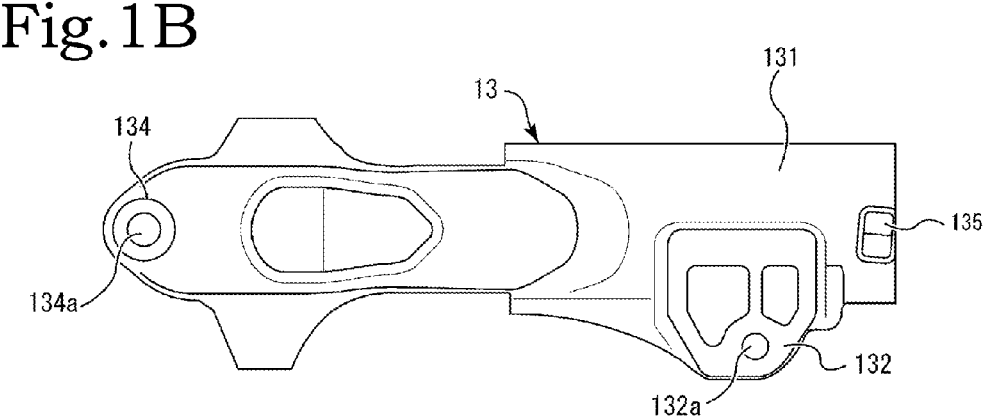
FIG. 1B is a side view of an outer column.
Figure 1C:
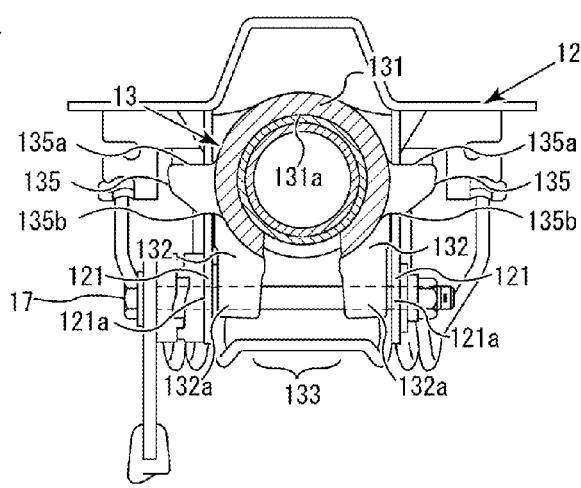
FIG. 1C is a cross-sectional view taken along arrow X-X.

As illustrated in FIGS. 1B and 1C, protrusion portions 135 that protrude in a width direction are integrally formed on both sides of the end on the vehicle rear side of the outer column 13. Both protrusion portions 135 protrude outward in the width direction further than the fixed side portions 121 on both sides of the fixing bracket 12. The position in the up-down direction of the protrusion portion 135 is located on or above a horizontal surface that passes through the shaft center of the outer column 13. In the example illustrated in FIG. 1C which is a view taken along arrow X-X, the protrusion portion 135 has an approximately triangular shape and an upper surface 135a and a lower surface 135b are formed in an approximately horizontal shape. The protrusion portion may be formed in a rectangular shape or the like.

When the telescopic position is adjusted by unclamping the clamping lever 16, the outer column 13 and the inner pipe 14 need to slide smoothly. In order to realize appropriate clamping force with the operation of the clamping lever 16, it is necessary to accurately machine an inner circumferential surface of the outer column 13. A range of the inner diameter of the grasping body portion 131 in which the inner pipe 14 slides is subjected to mechanical processing rather than being left in the cast sate.

Figure 2A:
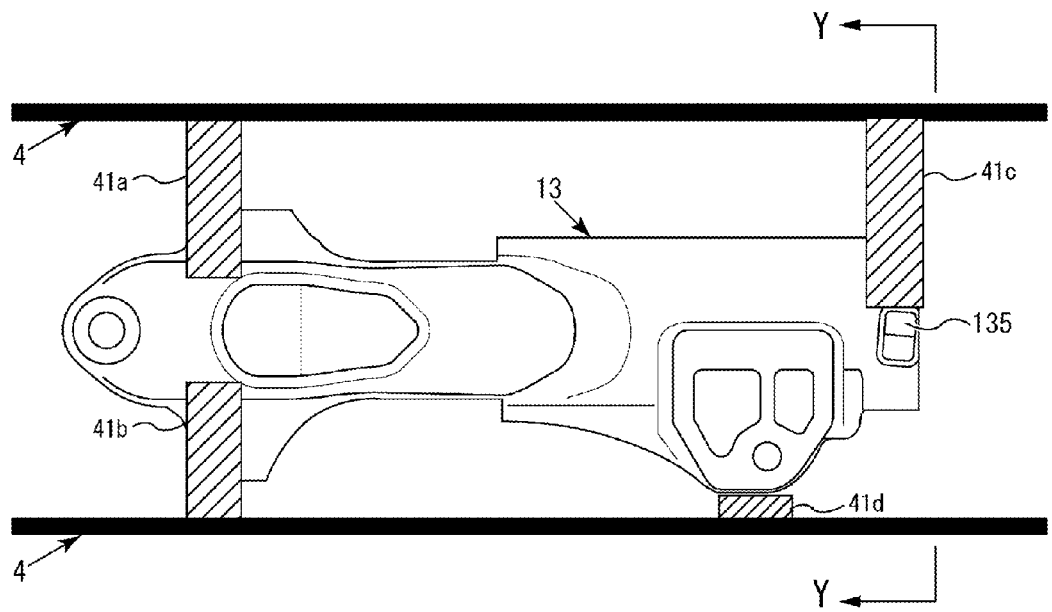
FIG. 2A is a diagram illustrating an example of fixing and holding an outer column of the steering apparatus according to the present invention when machining the outer column.
Figure 2B:
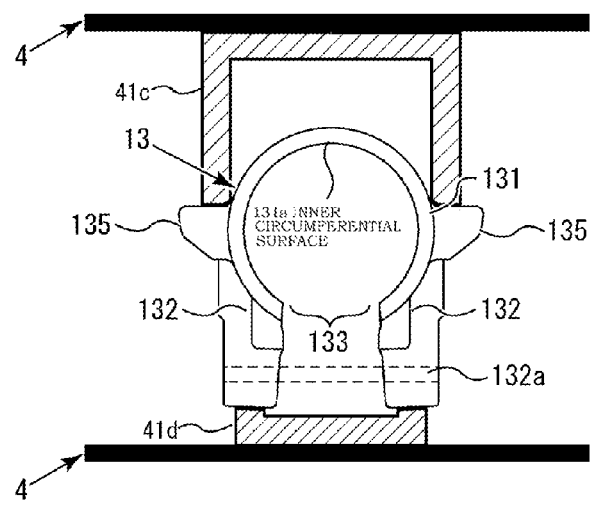
FIG. 2B is a view taken along arrow Y-Y.

As illustrated in FIGS. 2A and 2B, the inner diameter is processed in such a way that both ends in the axial direction of the outer column 13 are fixed to be immovable by holding tools 4 (41a, 41b, 41c, 41d) and processing is performed using a drill or the like. Since the slit 133 is formed on the rear side of the outer column 13, and a strain is likely to occur during processing. Therefore, as illustrated in FIG. 2B which is a view taken along arrow Y-Y, the holding tool 41c fixes the protrusion portion 135 by supporting from the same the upper surface of the protrusion portion 135. The holding tool 41d supports the clamping portion 132 from a lower side.

As described above, since the outer column 13 is fixed without applying any pressing force to the outer circumference thereof, it is possible to accurately machine and polish the inner diameter without causing any strain. When a contact surface of the holding tool is a horizontal surface and the upper surface 135a and the lower surface 135b of the protrusion portion 135 are formed as an approximately horizontal surface so as to match the contact surface of the holding tool, it is easy to fix the outer column 13. However, even when the contact surface of the protrusion portion is not a horizontal surface, if the contact surface is adjusted to engage with a surface shape of the contact surface of the holding tool 4, it is possible to create a stable fixed state.

When an impact load is applied to the steering wheel in the event of a secondary collision, the inner pipe 14 and the outer column 13 are pressed forward (the left side of FIG. 1A), and a rotational moment in a clockwise direction about the clamping bolt 17 occurs in the fixing bracket 12.

When the fixing bracket 12 starts rotating about the clamping bolt 17, the rear end of the fixed side portion 121 comes into contact with the front surface of the protrusion portion 135. In this way, it is possible to prevent rotation of the fixing bracket 12 and to absorb energy smoothly. Moreover, when the protrusion portion 135 is formed on the upper side than the horizontal surface that passes through the shaft center of the outer column 13, since the rear end of the fixed side portion 121 comes into contact with the protrusion portion 135 at an early stage at which the fixing bracket 12 starts rotating, it is possible to stop the rotation of the fixing bracket 12 with small force.

When a tooth portion having a concave-convex shape is formed on the rear edge of the fixed side portion 121, the tooth portion comes into contact with the front surface of the protrusion portion 135 in the event of a secondary collision, and it is possible to reliably prevent an upward displacement of the outer column 13. A tooth portion having a concave-convex shape is formed on a rear end of the fixed side portion of the fixing bracket 12. Alternatively, a tooth portion having a concave-convex portion is formed on the front surface of the protrusion portion 135. Alternatively, a tooth portion having a concave-convex portion is formed on both the rear end and the front surface.

Figure 3A:
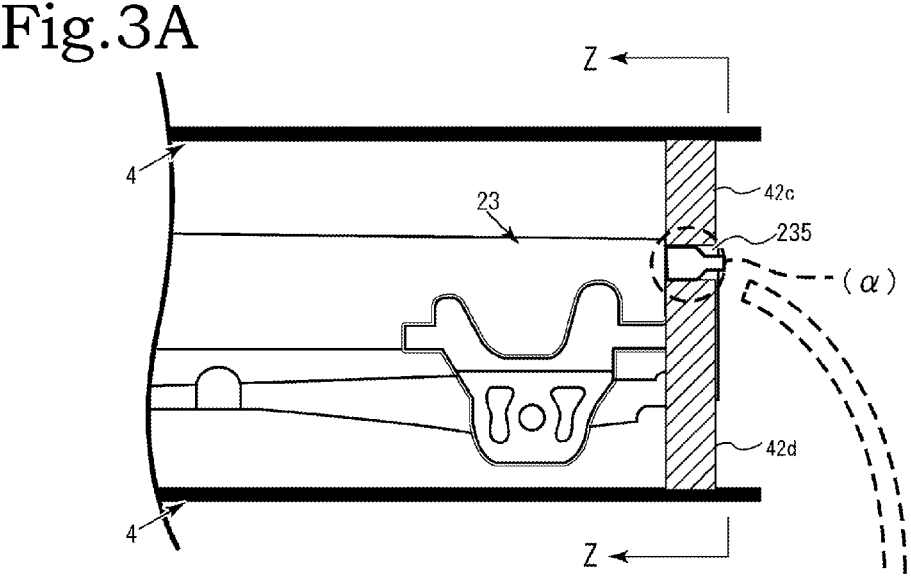
FIG. 3A illustrates an example of fixing and holding an outer column according to a second embodiment of the steering apparatus of the present invention in order to machine the outer column.
Figure 3B:
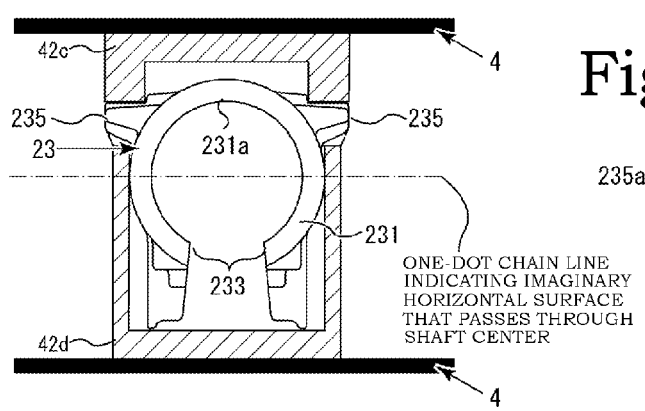
FIG. 3B is a view taken along arrow Z-Z.

An outer column 23 according to a second embodiment of the steering apparatus of the present invention will be described. FIG. 3A is a side view illustrating a state in which an inner circumferential surface 231a of the outer column 23 is fixed by holding tools 4 (42c and 42d) to machine the inner circumferential surface 231a and FIG. 3B is a view taken along arrow Z-Z. A protrusion portion 235 of the outer column 23 is formed on an upper portion of a grasping body portion 231.

Specifically, the protrusion portion 235 is formed on the upper side than a horizontal surface that passes through the shaft center of the inner circumferential surface 231a of the grasping body portion 231. The upper holding tool 42c comes into contact with the upper surface of the protrusion portion 235 and the lower holding tool 42d comes into contact with the lower surface of the protrusion portion 235 to create a fixed state. Thus, the protrusion portion 235 is formed on the opposite side of the position at which the slit 233 is formed in relation to the horizontal surface that passes through the shaft center of the grasping body portion 231 of the outer column.

When the inner diameter of the outer column 23 is processed, an inner circumferential surface on the opposite side of the slit 233 in relation to the horizontal surface that passes through the shaft center is processed more than the inner circumferential surface in which the slit 233 is formed. Due to this, a stable holding property is obtained during processing when the protrusion portion 235 is formed at a position close to a portion which is mainly processed. For example, in the outer column 23 in which the slit 233 is formed on the lower side, since a large area of the upper inner circumferential surface is processed, a stable holding property is obtained during processing when the protrusion portion 235 is formed closer to the upper side. Moreover, in the outer column 23 in which the slit 233 is formed on the upper side, since a large area of the lower inner circumferential surface is processed, a stable holding property is obtained during processing when the protrusion portion 235 is formed closer to the lower side.

Figure 3C:
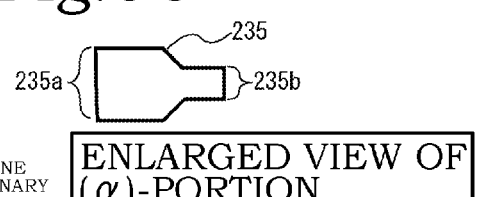
FIG. 3C is an enlarged view of a portion indicated by (α)
Figure 4:
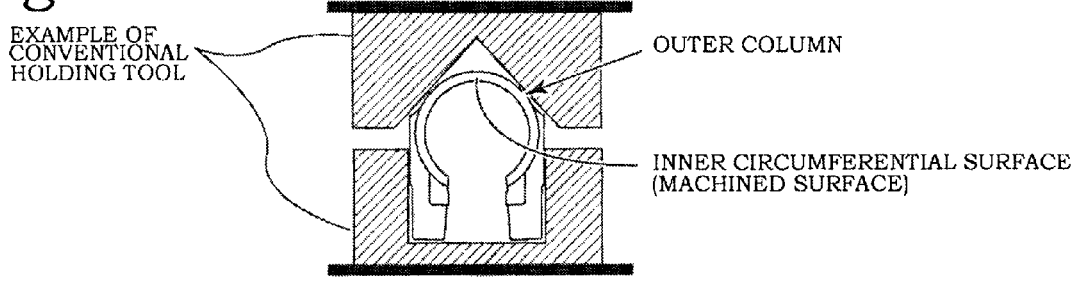
FIG. 4 is a diagram illustrating an example of a conventional fixing method when machining an outer column.

FIG. 3C is a side view of the protrusion portion 235 according to the second embodiment of the steering apparatus of the present invention. The protrusion portion 235 is formed so that the rear side is thinner than the front side. As a result, a rear side surface 235b of the protrusion portion 235 has a smaller size than a front side surface 235a. When such a shape is used, the side which collides with the fixing bracket 12 in the event of a secondary collision can be formed thick and strong. On the other hand, when the rear side is made thin, it is possible to prevent dents and cavities formed due to shrinkage during casting.

When the inner diameter of the outer column 23 is processed, since the holding tools 4 come into contact with the protrusion portions 135 and 235 to create a fixed sate, it is possible to process the inner diameter without deforming the outer column 23, thus making it easier to perform accurate machining. Particularly, when the outer column is processed in a ring shape, it becomes easy to realize high accuracy roundness. As a result, clamping and holding force is improved during clamping with a lever. Moreover, the inner pipe 14 slides smoothly during adjustment of the telescopic position.

Hereinabove, the present invention has been described by way of an example of a steering apparatus in which a slit is formed in an outer column and an inner pipe is grasped. However, the protrusion portion is also applicable to a steering apparatus having an outer column in which no slit is formed. The protrusion portion can be applied to an outer column which is formed of aluminum by die-casting and of which the inner circumferential surface is machined.

In the second embodiment, since the protrusion portion is formed on the opposite side of the slit in relation to the horizontal surface (that is, on the side where machining is required on a large area) and the protrusion portion is fixed, it is easy to obtain stability during processing. For example, when the slit is formed on the lower side than the horizontal surface, the protrusion portion is provided on the upper side than the horizontal surface and is fixed. In this way, it is possible to realize a stable fixed state during machining processing. On the other hand, when the slit is formed on the upper side than the horizontal surface, the protrusion portion is formed on the lower side than the horizontal surface and is fixed, In this way, it is possible to realize a stable fixed state during implementing machining processing on the lower side.

In the third embodiment, when the rear edge of the fixing bracket comes into contact with the front surface of the protrusion portion in the event of a secondary collision, a concave-convex shape of at least one of the rear edge and the front surface increases the sliding resistance and the rotation of the fixing bracket can be prevented more reliably.

In the fourth embodiment, since the rear side of the protrusion portion is thinner than the front side, it is possible to reduce defects during casting. That is, it is possible to prevent dents and cavities formed due to molding shrinkage which occurs easily in thick portions during casting. In the fifth embodiment, since the outer column is pressed and fixed to the protrusion portion which is formed integrally during casting, it is possible to process the inner circumferential surface of the outer column with high accuracy without requiring accurate setting and management of the pressing force.

What is claimed is:

1. A steering apparatus comprising:
    a fixing bracket fixed by being suspended on a vehicle body and having fixed side portions on both sides in a width direction of the vehicle body; and
    an outer column formed of aluminum by die-casting and sandwiched between the fixed side portions, wherein
    protrusion portions protruding toward both sides in the width direction are integrally formed on a rear end of the outer column, and
    the protrusion portions protrude outward in the width direction further than the fixed side portions on both sides of the fixing bracket.

2. The steering apparatus according to claim 1, wherein
    a slit extending in an axial direction is formed in the outer column, and
    the protrusion portions are formed integrally at a position corresponding to a horizontal surface that passes through a shaft center of the outer column or on an opposite side from a position at which the slit is formed in relation to the horizontal surface.

3. The steering apparatus according to claim 2, wherein at least one of a rear edge of the fixed side portion and a front surface of the protrusion portion has a concave-convex shape.

4. The steering apparatus according to claim 2, wherein a rear side of the protrusion portion is thinner than a front side of the protrusion portion.

5. The steering apparatus according to claim 2, wherein a rear end of the fixed side portion comes into contact with the front surface protrusion portion in a secondary collision.

6. The steering apparatus according to claim 1, wherein at least one of a rear edge of the fixed side portion and a front surface of the protrusion portion has a concave-convex shape.

7. The steering apparatus according to claim 1, wherein the protrusion portions are formed integrally at a position above a horizontal surface that passes through a shaft center of the outer column or on an opposite side from a position at which the slit is formed in relation to the horizontal surface.

8. The steering apparatus according to claim 7, wherein at least one of a rear edge of the fixed side portion and a front surface of the protrusion portion has a concave-convex shape.

9. The steering apparatus according to claim 7, wherein a rear side of the protrusion portion is thinner than a front side of the protrusion portion.

10. A steering apparatus comprising:
a fixing bracket fixed by being suspended on a vehicle body and having fixed side portions on both sides in a width direction of the vehicle body; and
an outer column formed of aluminum by die-casting and sandwiched between the fixed side portions, wherein
protrusion portions protruding toward both sides in the width direction are integrally formed on a rear end of the outer column, and wherein
a rear side of the protrusion portion is thinner than a front side of the protrusion portion.

* * * * *